United States Patent
Fedor et al.

(10) Patent No.: US 10,187,300 B2
(45) Date of Patent: Jan. 22, 2019

(54) FALLBACK MOBILE PROXY

(71) Applicant: Carrier Corporation, Jupiter, FL (US)

(72) Inventors: Szymon Fedor, Belmont, MA (US); Hector Moner Poy, Cork (IE); Philip J. Harris, Cork (IE)

(73) Assignee: CARRIER CORPORATION, Farmington, CT (US)

(*) Notice: Subject to any disclaimer, the term of this patent is extended or adjusted under 35 U.S.C. 154(b) by 38 days.

(21) Appl. No.: 15/364,687

(22) Filed: Nov. 30, 2016

(65) Prior Publication Data

US 2017/0163525 A1 Jun. 8, 2017

Related U.S. Application Data

(60) Provisional application No. 62/264,533, filed on Dec. 8, 2015.

(51) Int. Cl.
*H04L 12/703* (2013.01)
*H04L 12/66* (2006.01)
(Continued)

(52) U.S. Cl.
CPC .......... *H04L 45/28* (2013.01); *H04L 12/2803* (2013.01); *H04L 12/66* (2013.01);
(Continued)

(58) Field of Classification Search
CPC ................. H04L 12/2803; H04L 12/66; H04L 41/0654–41/0672; H04L 45/22; H04L 45/28
See application file for complete search history.

(56) References Cited

U.S. PATENT DOCUMENTS 7,853,261 B1 12/2010 Lewis et al.
8,279,831 B2 10/2012 Sengupta et al.
(Continued)

OTHER PUBLICATIONS

Brandenburg; "When the wire lets you down: Using 3G and 4G for wireless WAN backup"; SearchEnterpriseWAN; Nov. 12, 2015 retrieved from Internet; URL: http://searchenterprisewan.techtarget.com/feature/When-the-wire-lets-you-down-Using-3 . . . ; 6 pgs.
(Continued)

*Primary Examiner* — Pao Sinkantarakorn
(74) *Attorney, Agent, or Firm* — Cantor Colburn LLP

(57) ABSTRACT

A fallback mobile proxy system includes a gateway device having a local communication interface that establishes communication between a router and one or more smart home devices over a local communication network and one or more secondary local communication networks. The gateway device includes a processor that is configured to perform detecting a loss or degradation of connectivity between the router and a remote communication network. A mobile device is identified in communication with the router over the local communication network, where the mobile device has an alternate connectivity interface to the remote communication network. The mobile device is established as a fallback mobile proxy based on identifying the mobile device. Data is routed from/to the one or more smart home devices targeting the remote communication network to pass from/to the gateway device through the router and the fallback mobile proxy from/to the remote communication network.

16 Claims, 4 Drawing Sheets

(51) Int. Cl.
  *H04L 12/28* (2006.01)
  *H04L 29/08* (2006.01)
  *H04W 28/02* (2009.01)
  *H04L 12/707* (2013.01)

(52) U.S. Cl.
  CPC .......... *H04L 45/22* (2013.01); *H04L 67/1002* (2013.01); *H04L 67/2819* (2013.01); *H04W 28/0236* (2013.01)

(56) References Cited

U.S. PATENT DOCUMENTS

| | | |
|---|---|---|
| 8,571,545 B2 | 10/2013 | Ge et al. |
| 9,094,928 B2 | 7/2015 | Mathias et al. |
| 9,144,103 B2 | 9/2015 | Klein |
| 2011/0216646 A1* | 9/2011 | Flinta .................. H04L 12/66 370/220 |
| 2012/0227102 A1 | 9/2012 | Parla et al. |
| 2012/0287022 A1 | 11/2012 | Queen |
| 2013/0229270 A1 | 9/2013 | Srinivasan et al. |
| 2013/0229976 A1 | 9/2013 | Srinivasan et al. |
| 2014/0075011 A1 | 3/2014 | Salkintzis |
| 2014/0171065 A1 | 6/2014 | Graessley |
| 2015/0156679 A1 | 6/2015 | Li et al. |
| 2016/0294630 A1* | 10/2016 | Verma .................. H04L 41/12 |

OTHER PUBLICATIONS

Cloud Connect—Evolve IP; The Cloud Services Company; © 2015Evolve IP, LLC; Nov. 12, 2015 retrieved from Internet; URL: http://www.evolveip.net/network/cloud-connect; 2 pgs.
Failover / Business Continuity; USAT Corp; retrieved from Internet; Nov. 12, 2015; URL: http:f/usatcorp.com/solutions/failover-business-continuity; 6 pgs.
Lord, et al.; "Demand in My Pocket: Mobile Devices and the Data Connectivity Marshalled in Support of Everyday Practice"; CHI 2015, Apr. 2015, ACM; 2015; 10 pgs.
Netgear N300 Wireless ADSL2+ Modem Router Mobile Broadband Edition, Apr. 25, 2014 retrieved from Internet 'http://www.netgear.es/images/DGN2200M_DS_20Jan1172-8686, 2 pages.
Perfecting The Cloud Impacting the Future, retrieved from the internet Apr. 25, 2014 "http://arstechnica.com/information-technology/2013/10/new-router-combines-your-home-and-mobile-networks-into-one-faster-pipe/", 5 pages.
Rahmati, et al.; "Seamless Flow Migration on Smartphones without Network Support"; Dec. 14, 2010; retrieved from Internet; URL: http://arxiv.org/ftp/arxiv/papers/1012/1012.3071.pdf; 14 pgs.
Sharma, et al.; "OmniCon: A Mobile IP-based Vertical Handoff System for Wireless LAN and GPRS Links"; Computer Science Department, Stony Brook University; Stony Brook, NY, Apr. 27, 2004, 10 pgs.
Zeman; Google's Wireless Service Taps WiFi and Cellular—InformationWeek; Nov. 12, 2015 retrieved from Internet; URL: http://www.informationweek.com/mobile/mobile-business/googles-wireless-service-taps- . . . ; 11 pgs.

* cited by examiner

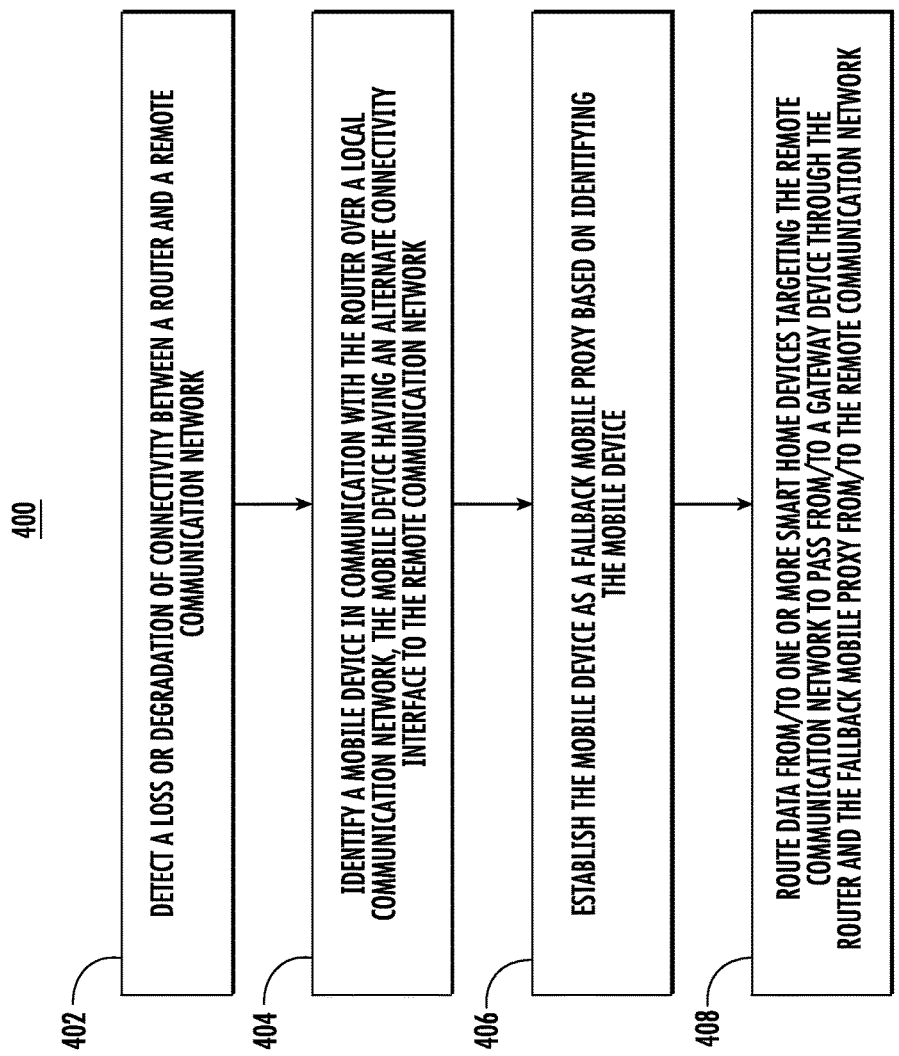

FALLBACK MOBILE PROXY

CROSS-REFERENCE TO RELATED APPLICATIONS

This patent application claims priority to U.S. Provisional Application No. 62/264,533, filed Dec. 8, 2015, which is incorporated herein by reference in its entirety.

DESCRIPTION OF RELATED ART

The subject matter disclosed herein relates to building automation and security, and more particularly to a fallback mobile proxy for maintaining cloud/server connectivity of building automation and security devices, in order to provide services such as remote system connectivity, collection of historic data, alarm triggering or data mining.

Typically, building automation and security systems, such as home management systems, interface with a remote monitoring system through a local control panel that establishes connectivity through an existing Internet connection. When the home management system uses cloud-based control, different connectivity options exist for connecting home-devices with the cloud. In this setting, home devices communicate with a gateway which acts as a proxy (i.e., forwarding messages between devices and the cloud) having limited control capabilities. One risk with such a system is dependence on the quality and availability of the Internet connection. When connection quality deteriorates, the system can only provide reduced functionality and may drop communication with a remote system entirely.

BRIEF SUMMARY

According to an embodiment, a fallback mobile proxy system includes a gateway device having a local communication interface that establishes communication between a router and one or more smart home devices over a local communication network and one or more secondary local communication networks. The gateway device includes a processor that is configured to perform detecting a loss or degradation of connectivity between the router and a remote communication network. A mobile device is identified in communication with the router over the local communication network, where the mobile device has an alternate connectivity interface to the remote communication network. The mobile device is established as a fallback mobile proxy based on identifying the mobile device. Data is routed from/to the one or more smart home devices targeting the remote communication network to pass from/to the gateway device through the router and the fallback mobile proxy from/to the remote communication network.

In addition to one or more of the features described above, or as an alternative, further embodiments could include where the gateway device is further configured to select the mobile device from a plurality of mobile devices based on a plurality of proxy selection rules.

In addition to one or more of the features described above, or as an alternative, further embodiments could include where the proxy selection rules include one or more of: a connection bandwidth of the alternate connectivity interface, a remaining data capacity of the alternate connectivity interface, an identified user of the mobile device, and a user preference indicator.

In addition to one or more of the features described above, or as an alternative, further embodiments could include where the gateway device establishes a plurality of fallback mobile proxies and splits the routing of the data between the fallback mobile proxies.

In addition to one or more of the features described above, or as an alternative, further embodiments could include where the mobile device detects the loss or degradation of connectivity between the router and the remote communication network and configures the fallback mobile proxy to listen for data to forward from/to the gateway device and/or notify the gateway device of availability as a proxy.

In addition to one or more of the features described above, or as an alternative, further embodiments could include where the fallback mobile proxy is configured to only forward the data from/to the one or more smart home devices.

In addition to one or more of the features described above, or as an alternative, further embodiments could include where the gateway device modifies a destination on data packets received from the one or more smart home devices to route the data through the fallback mobile proxy.

In addition to one or more of the features described above, or as an alternative, further embodiments could include where the gateway device ceases to route the data from/to the one or more smart home devices through the fallback mobile proxy based on detecting that connectivity between the router and the remote communication network has been restored.

In an embodiment, a method includes detecting a loss or degradation of connectivity between a router and a remote communication network. A mobile device is identified in communication with the router over a local communication network, where the mobile device has an alternate connectivity interface to the remote communication network. The mobile device is established as a fallback mobile proxy based on identifying the mobile device. Data is routed from/to one or more smart home devices targeting the remote communication network to pass through the router and the fallback mobile proxy from/to the remote communication network.

In addition to one or more of the features described above, or as an alternative, further embodiments could include selecting the mobile device from a plurality of mobile devices based on a plurality of proxy selection rules, where the proxy selection rules comprise one or more of: a connection bandwidth of the alternate connectivity interface, a remaining data capacity of the alternate connectivity interface, an identified user of the mobile device, and a user preference indicator.

In addition to one or more of the features described above, or as an alternative, further embodiments could include where a plurality of fallback mobile proxies is available and the routing of the data is split between the fallback mobile proxies.

In addition to one or more of the features described above, or as an alternative, further embodiments could include where the mobile device detects the loss or degradation of connectivity between the router and the remote communication network and configures the fallback mobile proxy to listen for data to forward and/or notify of availability as a proxy.

In addition to one or more of the features described above, or as an alternative, further embodiments could include where a gateway device modifies a destination on data packets received from/to the one or more smart home devices to route the data through the fallback mobile proxy, and the gateway device establishes communication between the router and the one or more smart home devices over the local communication network and one or more secondary local communication networks.

Technical function of the embodiments described above includes dynamically activating a fallback proxy in a mobile device and using the fallback proxy to securely forward data from one or more smart home devices over a local communication network to a remote communication network.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the several FIGURES:

FIG. 4 is a flow diagram of a method of using a fallback mobile proxy according to an embodiment.

DETAILED DESCRIPTION

Figure 1:
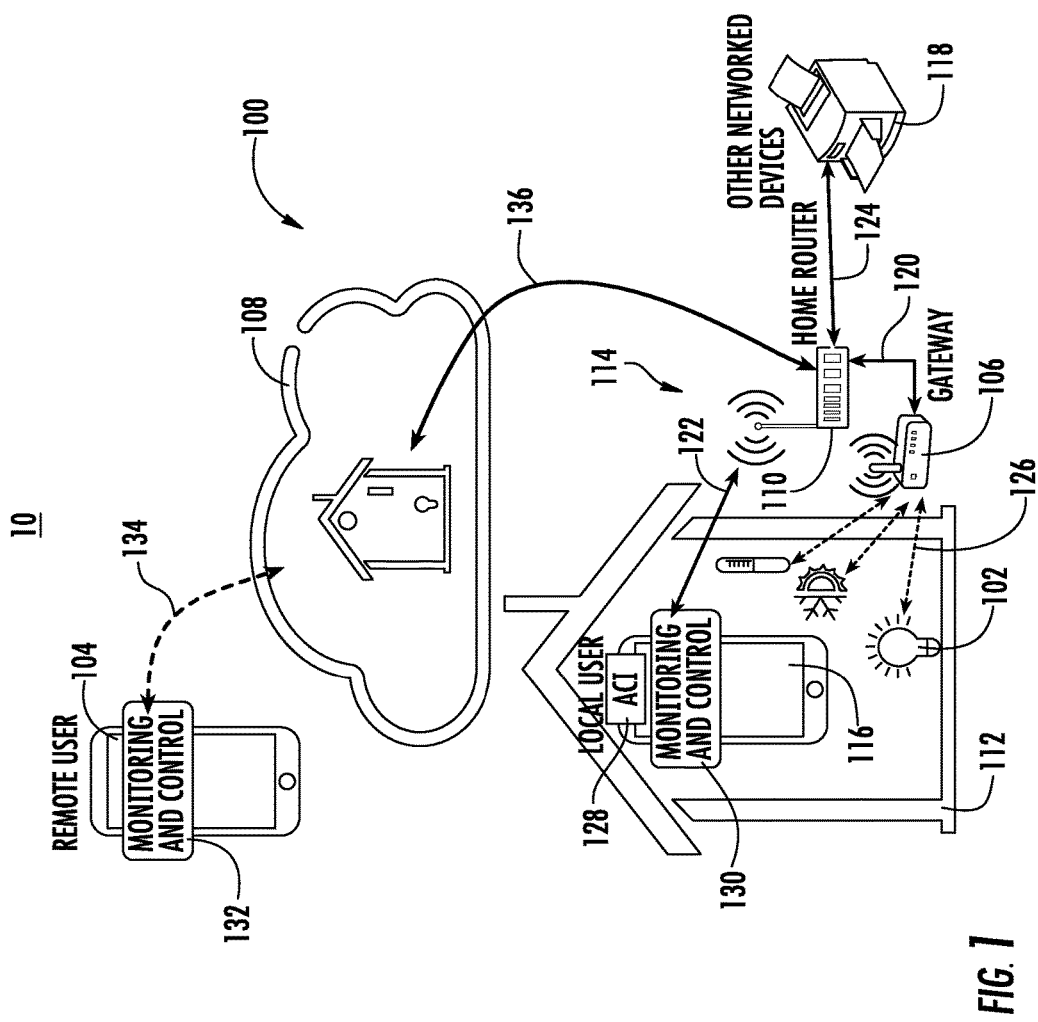
FIG. 1 illustrates a schematic view of a network environment operating in a normal configuration according to an embodiment.

Referring now to the drawings, FIG. 1 illustrates a schematic view of a network environment 10 operating in a normal configuration 100 according to an embodiment. Embodiments mitigate the impact of reduced connectivity between smart home devices 102 and a remote system 104. Smart home devices 102 can include one or more networked devices for home control, automation, monitoring, entertainment and security, such as thermostats, lighting controls, water sensors, security sensors, cameras, and the like. The smart home devices 102 can be connected through a gateway device 106, which then accesses a server or cloud infrastructure located in a remote communication network 108, such as the Internet, via a router 110 (i.e., an in-home router) at a home location 112. The router 110 may include a wireless fidelity (Wi-Fi) interface to establish a local communication network 114. In an embodiment, the local communication network 114 covers a relatively small area, e.g., hundreds of square feet, to communicate with a variety of local devices at the home location 112. The home location 112 need not be a residence and may include, for example, a school, business, laboratory, office building, and the like. In some embodiments, all or a portion of the functionality of the gateway device 106 can incorporated in one or more of the smart home devices 102.

Examples of devices that can communicate through the router 110 on the local communication network 114 include the gateway device 106, one or more mobile devices 116, and other networked devices 118 such as computers, printers, home entertainment systems and the like. In the example of FIG. 1, the local communication network 114 includes a communication link 120 between the router 110 and the gateway device 106, a communication link 122 between the router 110 and at least one mobile device 116, and communication link 124 between the router 110 and other networked devices 118. The communication links 120-124 can include wired and/or wireless communication links. The gateway device 106 and one or more of the mobile devices 116 may separately or in combination be referred to as a fallback mobile proxy system.

One or more secondary local communication networks can be formed through a plurality of communication links 126 between the smart home devices 102 and the gateway 106. The communication links 126 can be wired or wireless links. The communication links 126 of the one or more secondary local communication networks may operate using different communication protocols and technologies than the communication links 120-124. In some embodiments, the communication links 126 can be short range signals such as near field communication signals, RFID signals, and Bluetooth signals, while in other embodiments, the communication links 126 can be longer range signals such as Wi-Fi or X10 signals. Further examples of secondary local communication network formats that can be supported by one or more of the communication links 126 include ZWave, ZigBee, ISM, 802.15.4, BLE or ISM technologies, and others known in the art.

In the illustrated embodiment, mobile devices 116 can be carried, held or otherwise associated with building occupants at the home location 112. In the illustrated embodiment, the mobile devices 116 can be mobile phones, tablet computers, and/or other such devices that include an alternate connectivity interface 128, such as a 3G or 4G interface operable to communicate with the remote communication network 108, e.g., to access cloud-based applications, storage, servers, and/or web sites. In the example of FIG. 1, a local user can operate a mobile device 116, while a remote user may operate the remote system 104. The remote system 104 can also be another mobile device similar to the mobile device 116 or other computer system operable to interface with the remote communication network 108.

A monitoring and control application 130 installed on mobile device 116 can enable a local user to inspect the state and change the configuration of smart home devices 102 via communication link 122 through the router 110 in the local communication network 114 to the gateway device 106 and through communication links 126. Similarly, a remote user of the remote system 104 can use a monitoring and control application 132 to exchange data with the smart home devices 102 through a communication link 134 with the remote communication network 108, where the router 110 is reachable through the remote communication network 108 via communication link 136. The router 110 then allows communication from/to the smart home devices 102 through communication link 120 to gateway device 106 and communication links 126 between the gateway device 106 and smart home devices 102. Further, other secure systems (not depicted), such as a cloud server or a security company system, may also communicate with the gateway device 106 and/or smart home devices 102 through the communication link 136 to the router 110 via the remote communication network 108. Although only a single instance of the remote system 104, mobile device 116, and other networked devices 118 are depicted, it will be understood that there may be multiple instances of the remote system 104, mobile device 116, and/or other networked devices 118.

Figure 2:
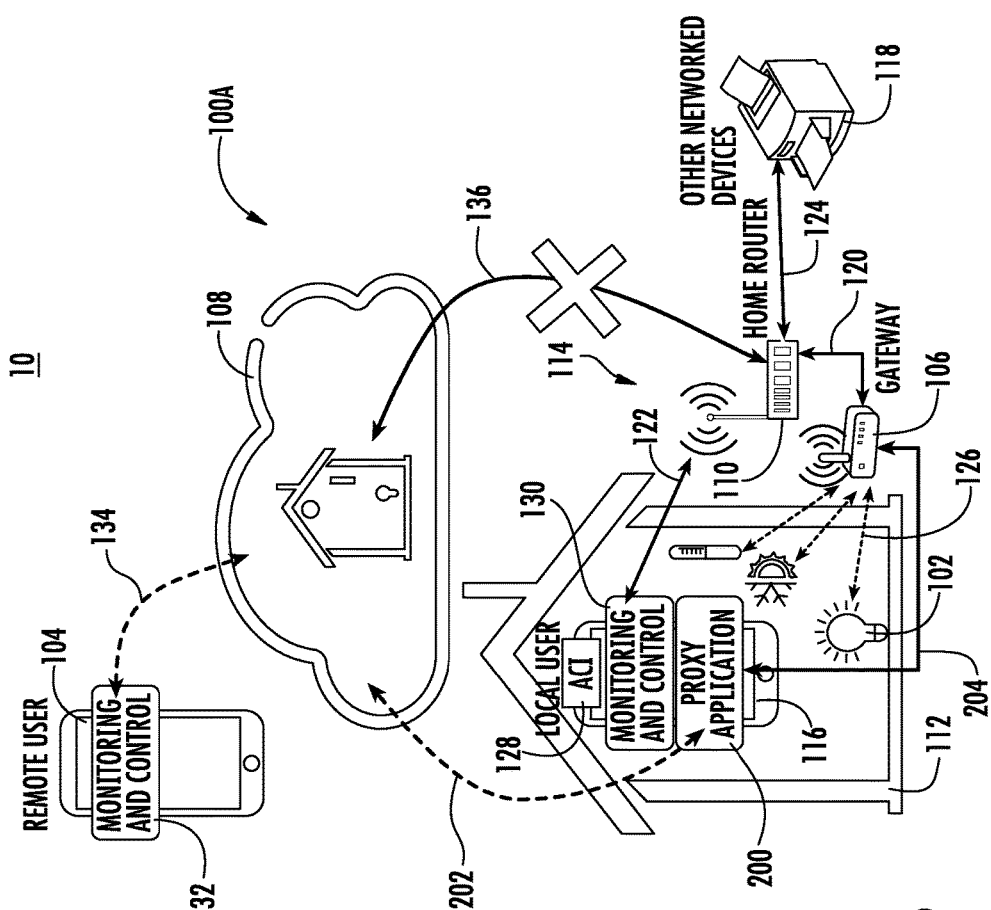
FIG. 2 illustrates a schematic view of the network environment of FIG. 1 operating in a fallback proxy configuration according to an embodiment.

FIG. 2 illustrates a schematic view of the network environment 10 operating in a fallback proxy configuration 100A according to an embodiment. In an embodiment, the gateway device 106 runs a service that monitors connectivity with the remote communication network 108 to automatically detect loss or degradation of connectivity and assume the role of relaying communication between smart home devices 102 and the remote communication network 108 through the alternate connectivity interface 128 of one or more mobile devices 116. When a loss or degradation of connectivity of the communication link 136 is detected, the gateway device 106 can discover mobile devices 116 at the home location 112 connected to the router 110 via the local communication network 114. The gateway device 106 can select the most appropriate instance or instances of the mobile device 116 to serve as a fallback mobile proxy. The gateway device 106 may also notify the selected mobile device or devices 116 of the disruption. Alternatively, one or more of the mobile devices 116 can monitor for a degradation or loss of communication between the router 110 and the remote communication network 108. One or more of the mobile devices 116 can notify the gateway device 106 of the detected loss or degradation of connectivity of the communication link 136. In some embodiments, one or more of the smart home devices 102 can detect loss or degradation of connectivity and/or discover mobile devices 116.

The selected mobile device 116, when receiving the connection disruption notification, can start a fallback mobile proxy application 200 that forwards data 204 between the gateway device 106 and the remote communication network 108 through an alternate communication link 202 (e.g., a cellular network link) via the alternate connectivity interface 128. In some embodiments, one or more of the smart home devices 102 interface with the fallback mobile proxy application 200 absent the gateway device 106. The fallback mobile proxy application 200 may only forward packets between trusted parties, relaying additional security responsibilities to the source and destination entities. For instance, the fallback mobile proxy application 200 can enable the monitoring and control application 132 of remote system 104 to exchange data with the smart home devices 102 through remote communication network 108 and local communication network 114 while the communication link 136 between the remote communication network 108 and router 110 is degraded or non-operational. Further, the fallback mobile proxy application 200 can block or deny access attempts by other networked devices 118 on the local communication network 114 from using the alternate communication link 202 to reach the remote communication network 108.

In case the communication link 136 is restored, the gateway device 106 can reconfigure the network environment 10 to the normal configuration 100 of FIG. 1. A method for receiving a disruption notification (e.g., based on a monitoring a specific port) and starting the fallback mobile proxy application 200 can be embedded in the monitoring and control application 130 to maintain a connection with the remote communication network 108, e.g., a cloud server of the remote communication network 108 may provide asynchronous notifications. The monitoring and control application 130 can start listening for incoming messages from the gateway device 106 when a connection with the remote communication network 108 through the router 110 is detected as broken or degraded. Additionally, several mobile devices 116 at the home location 112 can be selected to act as fallback mobile proxies at the same time in case additional bandwidth is required. The fallback mobile proxy application 200 may also periodically check if connectivity with the communication link 136 using the local communication network 114 has been restored.

Figure 3:
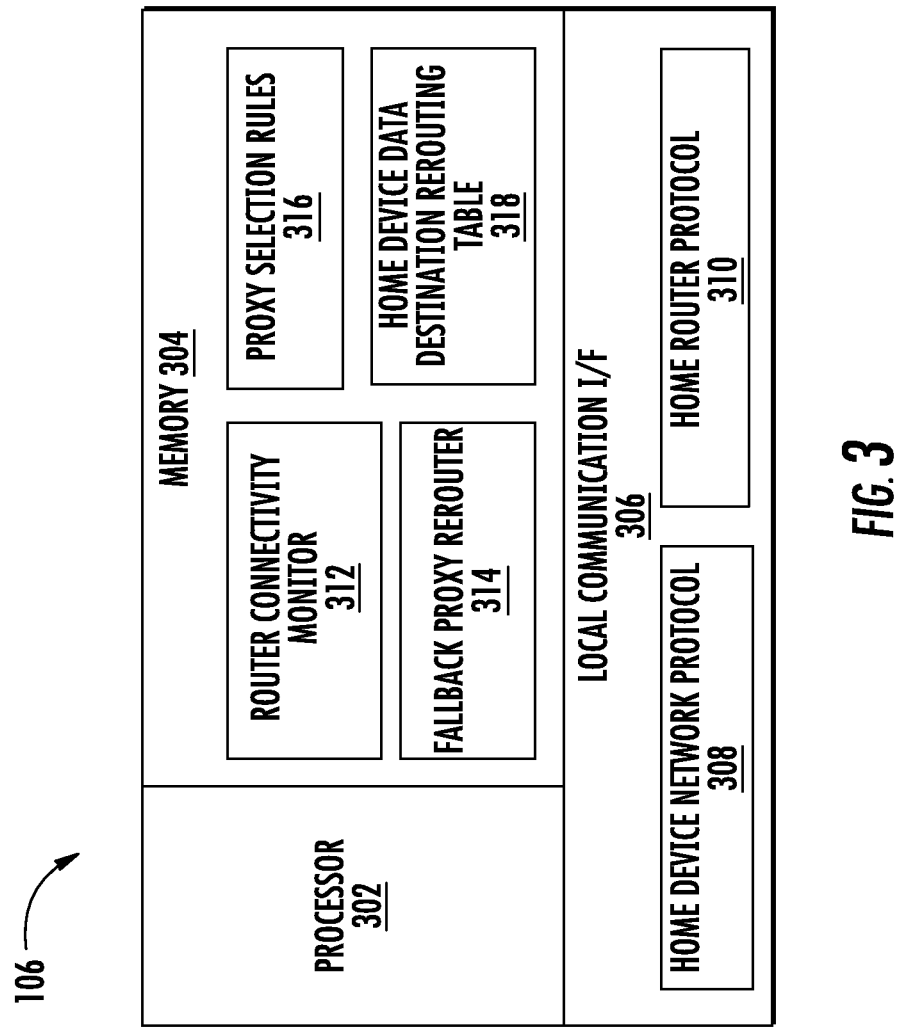
FIG. 3 illustrates a block diagram of gateway device according to an embodiment.

In the example of FIG. 3, the gateway device 106 includes a processor 302, memory 304, and a local communication interface 306 which may support a home device network protocol 308 and a home router protocol 310. The home device network protocol 308 and home router protocol 310 may support one or more communication protocols and technologies specific to the communication links 120 and 126 of FIGS. 1 and 2. The processor 302 can be any type or combination of computer processors, such as a microprocessor, microcontroller, digital signal processor, application specific integrated circuit, programmable logic device, and/or field programmable gate array. The memory 304 is an example of a non-transitory computer readable storage medium tangibly embodied in the gateway device 106 including executable instructions stored therein, for instance, as firmware. Examples of instructions that can be stored in the memory 304 for execution by the processor 302 include a router connectivity monitor 312 and a fallback proxy re-router 314. The memory 304 may also store proxy selection rules 316 and a home device data destination re-routing table 318.

The router connectivity monitor 312 can monitor a port of the router 110 for a loss or degradation of connectivity between the router 110 and remote communication network 108 on communication link 136. Upon detecting a loss or degradation of connectivity, the gateway device 106 can examine the proxy selection rules 316 and identify one or more mobile devices 116 in communication with router 110 over the local communication network 114 to determine which mobile device 116 to select as a fallback mobile proxy. The router connectivity monitor 312 may directly contact the selected instance or instances of the mobile device 116 to trigger launching/enablement of the fallback mobile proxy application 200. Alternatively, each mobile device 116 may independently discover the loss or degradation of communication link 136 and listen for proxy messages from the gateway device 106. Further, each mobile device 116 may send a notification to the gateway device 106 indicating that a loss or degradation of communication link 136 has been detected and that the mobile device 116 is available to become a proxy. Proxy selection rules 316 can include one or more of: a connection bandwidth of the alternate connectivity interface, a remaining data capacity of the alternate connectivity interface, an identified user of the mobile device 116, and a user preference indicator.

The fallback proxy re-router 314 can use data in the home device data destination re-routing table 318 to determine destination information for routing data from the smart home devices 102 to the remote communication network 108 via the fallback mobile proxy application 200. For example, data from one group of smart home devices 102 may be routed to one mobile device 116 by adding a first proxy routing header while data from another group of smart home devices 102 can be routed to a different mobile device 116 at home location 112 by adding a second proxy routing header. The home device data destination re-routing table 318 may be dynamically updated at runtime and may change as parameters of the network environment 10 change. For instance, as an available data budget (e.g., a monthly data quota) is consumed for a particular mobile device 116, data 204 may be rerouted to another mobile device 116. Similarly, if the communication links 122 and/or 202 for a particular mobile device 116 experience problems, the destination of data from smart home devices 102 may be re-assigned to a different mobile device 116.

FIG. 4 illustrates a method 400 of using a fallback mobile proxy according to embodiments. The method 400 can be performed by various elements of FIGS. 1-3 and is described in reference to FIGS. 1-3. At block 402, a loss or degradation of connectivity between router 110 and remote communication network 108 can be detected by gateway device 106 and/or monitor and control application 130 of mobile device 116. For example, the mobile device 116 can detect the loss or degradation of connectivity of communication link 136 between the router 110 and the remote communication network 108 and configure the fallback mobile proxy application 200 to listen for data 204 to forward from/to the gateway device 106.

At block 404, a mobile device 116 is identified in communication with the router 110 over local communication network 114, where the mobile device 116 has an alternate connectivity interface 128 to communicate with the remote communication network 108. The device gateway 106 may select the mobile device 116 from a plurality of mobile devices 116 at the home location 112 based on a plurality of proxy selection rules 316 as previously described with respect to FIG. 3.

At block 406, at least one mobile device 116 is established as a fallback mobile proxy to run fallback mobile proxy application 200 based on identifying the mobile device 116. The gateway device 106 can establish a plurality of fallback mobile proxies and split the routing of the data 204 between the fallback mobile proxies.

At block 408, data 204 from one or more smart home devices 102 targeting the remote communication network 108 are routed to pass from gateway device 106 through the router 110 and the fallback mobile proxy application 200 to the remote communication network 108, where the gateway device 106 establishes communication between the router 110 and the one or more smart home devices 102 over the local communication network 114 and one or more secondary local communication networks formed by communication links 126. This allows the remote system 104 and other entities of the remote communication network 108 to continue interfacing with the smart home devices 102 when communication link 136 is degraded or broken. The gateway device 106 can modify a destination of data packets received from the one or more smart home devices 102 to route the data 204 bi-directionally through the fallback mobile proxy application 200. The fallback mobile proxy application 200 can be configured to only forward the data from the one or more smart home devices 102. Routing of the data 204 from/to the one or more smart home devices 102 through the fallback mobile proxy application 200 may cease based on detecting that connectivity between the router 110 and the remote communication network 108 has been restored.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A fallback mobile proxy system, comprising:
a gateway device comprising a local communication interface that establishes communication between a router and one or more smart home devices over a local communication network and one or more secondary local communication networks, the gateway device further comprising a processor that is configured to perform:
detecting a loss or degradation of connectivity between the router and a remote communication network;
identifying a mobile device in communication with the router over the local communication network, the mobile device having an alternate connectivity interface to the remote communication network;
selecting the mobile device from a plurality of mobile devices based on a plurality of proxy selection rules, wherein the proxy selection rules comprise one or more of: a connection bandwidth of the alternate connectivity interface, a remaining data capacity of the alternate connectivity interface, an identified user of the mobile device, and a user preference indicator;
establishing the mobile device as a fallback mobile proxy based on identifying the mobile device; and
routing data from/to the one or more smart home devices targeting the remote communication network to pass from/to the gateway device through the router and the fallback mobile proxy from/to the remote communication network.

2. The fallback mobile proxy system of claim 1, wherein the gateway device establishes a plurality of fallback mobile proxies and splits the routing of the data between the fallback mobile proxies.

3. The fallback mobile proxy system of claim 1, wherein the mobile device detects the loss or degradation of connectivity between the router and the remote communication network and configures the fallback mobile proxy to listen for data to forward from/to the gateway device and/or notify the gateway device of availability as a proxy.

4. The fallback mobile proxy system of claim 3, wherein the fallback mobile proxy is configured to only forward the data from/to the one or more smart home devices.

5. The fallback mobile proxy system of claim 1, wherein the gateway device modifies a destination on data packets received from the one or more smart home devices to route the data bi-directionally through the fallback mobile proxy.

6. The fallback mobile proxy system of claim 1, wherein the gateway device ceases to route the data from/to the one or more smart home devices through the fallback mobile proxy based on detecting that connectivity between the router and the remote communication network has been restored.

7. A method comprising:
detecting a loss or degradation of connectivity between a router and a remote communication network;
identifying a mobile device in communication with the router over a local communication network, wherein the mobile device has an alternate connectivity interface to the remote communication network;
selecting the mobile device from a plurality of mobile devices based on a plurality of proxy selection rules, wherein the proxy selection rules comprise one or more of: a connection bandwidth of the alternate connectivity interface, a remaining data capacity of the alternate connectivity interface, an identified user of the mobile device, and a user preference indicator;
establishing the mobile device as a fallback mobile proxy based on identifying the mobile device; and
routing data from/to one or more smart home devices targeting the remote communication network to pass through the router and the fallback mobile proxy from/to the remote communication network.

8. The method of claim 7, wherein a plurality of fallback mobile proxies is available and the routing of the data is split between the fallback mobile proxies.

9. The method of claim 7, wherein the mobile device detects the loss or degradation of connectivity between the router and the remote communication network and configures the fallback mobile proxy to listen for data to forward and/or notify of availability as a proxy.

10. The method of claim 9, wherein the fallback mobile proxy is configured to only forward the data from/to the one or more smart home devices.

11. The method of claim 7, wherein a gateway device modifies a destination on data packets received from/to the one or more smart home devices to route the data bi-directionally through the fallback mobile proxy, wherein the gateway device establishes communication between the router and the one or more smart home devices over the local communication network and one or more secondary local communication networks.

12. The method of claim 7, further comprising:
ceasing to route the data from/to the one or more smart home devices through the fallback mobile proxy based on detecting that connectivity between the router and the remote communication network has been restored.

13. A fallback mobile proxy system, comprising:
a gateway device comprising a local communication interface that establishes communication between a router and one or more smart home devices over a local communication network and one or more secondary local communication networks, the gateway device further comprising a processor that is configured to perform:
detecting a loss or degradation of connectivity between the router and a remote communication network;
identifying a mobile device in communication with the router over the local communication network, the mobile device having an alternate connectivity interface to the remote communication network;
establishing the mobile device as a fallback mobile proxy based on identifying the mobile device, wherein the mobile device detects the loss or degradation of connectivity between the router and the remote communication network and configures the fallback mobile proxy to listen for data to forward from/to the gateway device and/or notify the gateway device of availability as a proxy; and
routing data from/to the one or more smart home devices targeting the remote communication network to pass from/to the gateway device through the router and the fallback mobile proxy from/to the remote communication network.

14. The fallback mobile proxy system of claim 13, wherein the fallback mobile proxy is configured to only forward the data from/to the one or more smart home devices.

15. A method comprising:
detecting a loss or degradation of connectivity between a router and a remote communication network;
identifying a mobile device in communication with the router over a local communication network, wherein the mobile device has an alternate connectivity interface to the remote communication network;
establishing the mobile device as a fallback mobile proxy based on identifying the mobile device, wherein the mobile device detects the loss or degradation of connectivity between the router and the remote communication network and configures the fallback mobile proxy to listen for data to forward and/or notify of availability as a proxy; and
routing data from/to one or more smart home devices targeting the remote communication network to pass through the router and the fallback mobile proxy from/to the remote communication network.

16. The method of claim 15, wherein the fallback mobile proxy is configured to only forward the data from/to the one or more smart home devices.

* * * * *